Jan. 9, 1968     L. PATRIGNANI     3,362,284

DIMENSIONAL MEASUREMENT DEVICES

Filed June 4, 1963     3 Sheets-Sheet 2

United States Patent Office 3,362,284
Patented Jan. 9, 1968

3,362,284
DIMENSIONAL MEASUREMENT DEVICES
Leonida Patrignani, Florence, Italy, assignor to Mavilor Manufacture de Vilebrequins de Lorette, Lorette, Loire, France, a society of France
Filed June 4, 1963, Ser. No. 285,402
Claims priority, application Italy, June 6, 1962, 12,267/62
5 Claims. (Cl. 88—14)

The present invention is concerned with a dimensional measurement device without material contact with the piece to be measured, in order to perform linear (radial or axial) or angular measurements, or to determine surface states, eccentricities or wear of pieces, either stationary or in movement.

A device according to the present invention permits an accurate and quick measurement of the diameters, the lengths or the bores of pieces, either moving or stationary, of any shape or size without having recourse to a material contact with the pieces to be examined.

Such a device permits of determining on a moving piece the dimensions thereof, independently of the vibrations and of the eccentricity of the movement itself.

It permits of reading the dimensions in a direct and immediate manner, in the form of numbered values, and not through the intermediate of calipers, gauges or other pieces the dimensions of which have been determined in advance.

A device provided with the improvements according to the invention may be used on machine-tools performing elementary machining operations (turning, drilling, rectifying, boring, etc.) since it enables the operator either to fix, and therefore to impose, the dimensions and positions to be obtained by means of any machining operation (by preselection of the desired dimension) or to follow, and immediately to read, the result of the work of the cutting, abrasion or shaping tools by obtaining signals warning of the approach or of the reaching of the desired dimension.

A device according to the invention further permits, when this is necessary, of operating any control and/or automatization systems. It may record successive measurements in an additive or subtractive manner, while keeping in a memory device, and supplying, the results of the addition or subtraction operation.

According to the present invention, the dimensional measurement device, without material contact with the piece to be measured, consists of the combination of means for forming a first image of a slit, or the like, opposite a first surface element of the piece to be measured, in such manner that said piece can come partly to intercept or cut off, at the level of said surface element, said first image, of a pair of optical reflecting means movable with respect to each other and adapted to form from said first image, when it is not cut off by said piece, a second image, of the same direction and dimension as said first nonintercepted image, opposite a second surface element of the piece to be measured, in such manner that said piece is located exactly between the luminous or analogous beams on their outgoing and return paths, respectively entering and issuing from, said pair of optical reflecting means, the dimensions to be measured being the distance between said first and second surface elements, of means for displacing said optical reflecting means with respect to each other, and of means for accurately determining the interval between said reflecting means at the time where it begins or, respectively, ceases the total obturation of the portion of the second image that corresponds to the nonobturated portion of the first image.

In a particular embodiment of the invention the means for forming the first image of the slit consists of a source of luminous or analogous radiations, a slit and at least one lens, whereas the pair of optical reflecting means consists of a first and second system each constituted by at least one lens and a total reflection prism having as section a rectangular triangle, this optical system being completed by a receiving system comprising at least one lens and a photoelectric transducer which is normally illuminated through said lens by the second image when the latter is not shut off and which ceases to be illuminated when said second image is shut off by the piece to be measured, means being provided for stopping the relative displacement between the two lens and prism systems when said transducer ceases, or respectively begins, to be illuminated by said second image. In then suffices accurately to measure the distance between the outgoing and return light beams, that is to say the distance between the reflection points of the two total reflection prisms.

It is advantageous to provide in some cases a relative displacement between the source of radiations and the receiving systems in synchronism with the relative displacement between the two lens and prism systems in such manner that the outgoing and return beams are perfectly parallel to each other.

With a device according to the invention a change in the relative position of the piece to be measured does not change the result of the measurement, because the second image (formed by the return beam) is either shut off or not by the piece according to the position of the two lens-prism systems which have a relative movement toward or away from each other, so that the transducer is illuminated and transmits, in response to this illumination, an electric signal only from the time at which the distance between the outgoing and return beans is equal to the dimension to be measured. It is this electric signal which controls the stopping of the relative displacement of the lens-prism systems in the preferred embodiment of the invention.

The device for measuring this distance may be of the electronic type and act upon a counter which directly indicates the distance with the required precision. The counter may in turn control a memory device, a reading device and/or a control device. When necessary, it is possible to obtain a precision of the order of one micron.

The device according to the invention may also be applied to perform measurements on pieces limited by surfaces of revolution, even when these pieces are rotating about their axis, the device permitting both measurement of the diameters and axial measurements, for instance between shoulders.

A device according to the invention also permits of measuring variations of profiles with respect to a circular profile by effecting a series of readings in different angular positions of the piece to be measured. In this case, it is preferable to make use of modulated radiations (light source alternately active and inactive) and to provide on the one hand equality between the frequency of rotation of the piece (number of revolutions per second) and the frequency of the modulated radiations which produces the image (number of switchings on and off per second of the light source) and on the other hand the possibility of adjustably varying the phase of the movements of the rotating piece with respect to the times where radiations are produced. In this case the light is emitted and cut off by the piece when it occupies a given angular position, adjustable by modifying the angular phase relation.

In order to perform the measurements quickly while maintaining the high degree of precision that can be reached with the device according to the invention, means are advantageously provided for ensuring the relative displacement of the reflecting means or lens-prism systems (and possibly, in synchronism, the relative displacement of the light source together with its slit and lens with respect to the photoelectric transducer with its lens), first at a fast speed of approach toward the right position, that is to say toward the limit position for which total cut-off of the second image by the piece to be measured begins or ends and, subsequently, at a slow speed, to reach this limit position.

Preferred embodiments of the present invention will be hereinafter described with reference to the appended drawings, given merely by way of example, and in which.

Figure 1:
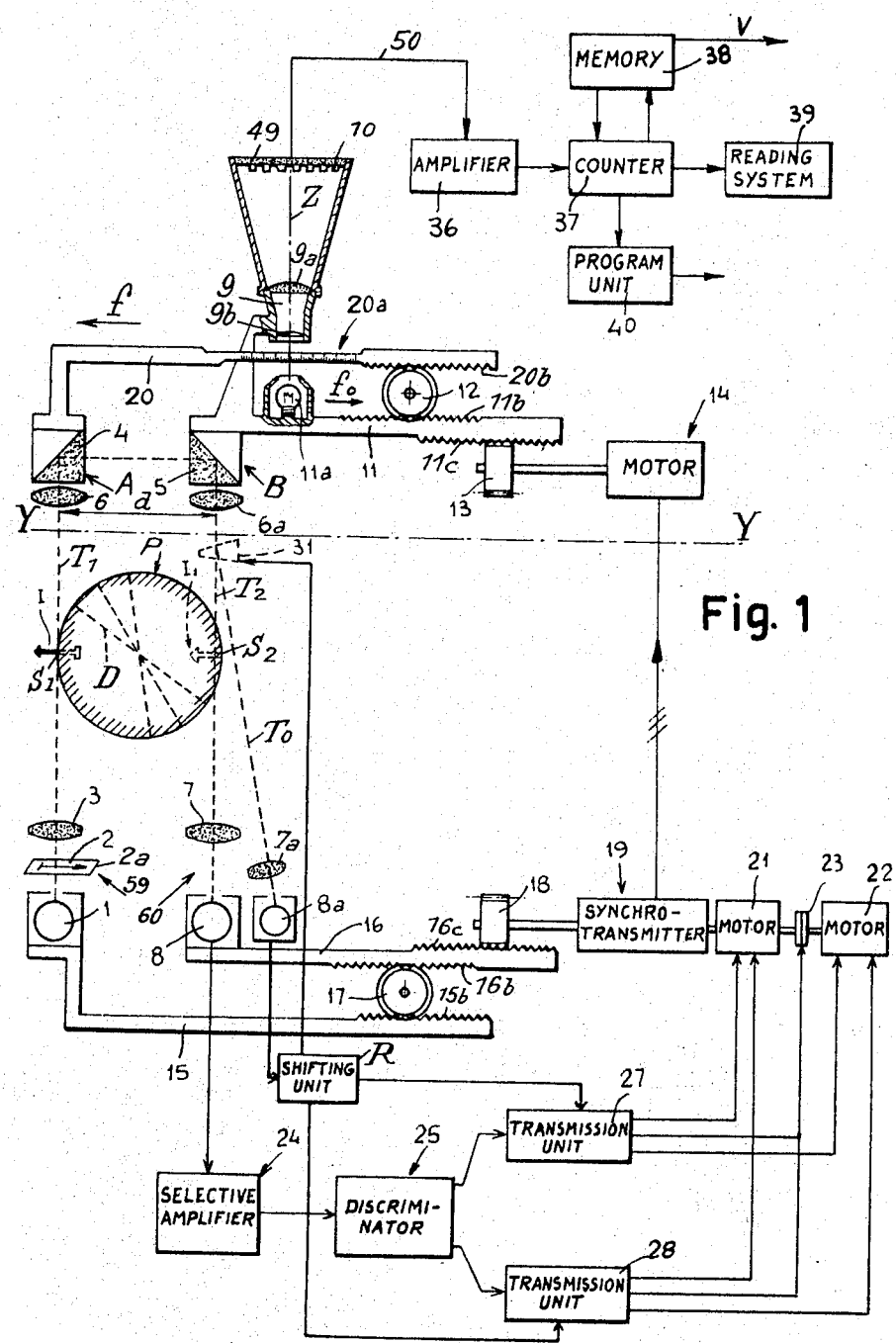
FIG. 1 shows an embodiment of the invention permitting, in particular, measurement of radial distances.

Reference will first be made to FIG. 1, where P represents the piece, for instance of circular cross section, the diameter of which is to be measured between a first surface element $S_1$ and a second surface element $S_2$ diametrically opposed to the first one.

The measurement device comprises, in the embodiment illustrated by the drawings, the following elements:

Optical means 59 for forming the image I of a slit opposite the first surface element $S_1$ of piece P, said means 59 comprising for instance a radiation source 1, a slit 2 provided in a screen $2_a$, and a lens 3 forming the image of slit 2 at I, opposite surface $S_1$;

Measurement systems A and B, each comprising a lens 6, $6_a$ and a total reflection prism 4, 5 having in section the shape of a rectangular triangle prism 4 and lens 6 having a common optical axis $T_1$ in coincidence with that of means 59 and lens 6 having its object focal plane in coincidence with the plane of image I so as to transform the beam issuing from image I into a parallel beam, whereas lens $6_a$ has its image focal plane opposite surface element $S_2$ in such manner as to transform the parallel beam reflected by prisms 4 and 5 into a convergent beam opposite surface element $S_2$, this producing an image $I_1$ of slit 2 of the same dimension and of the same direction as image I (when it is not partly cut off by piece P), and this whatever be the distance between measurement systems A and B; and A receiver system 60 (the s axis of which is in coincidence with axis $T_2$ of system B) comprising a lens 7 and a photoelectric transducer 8, lens 7 projecting image $I_2$ onto the sensitive surface of transducer 8 in such manner as to produce, in response to image $I_1$, an electric signal at the output of transducer 8.

In the absence of a piece P between the light paths of respective axes $T_1$ and $T_2$, images I and $I_1$, are identical. When a piece P partly cuts off image I, the portion (in solid lines) of image I that is not cut off is reproduced by the optical system 6, 4, 5, $6_a$ to give a partial image (portion of $I_1$) of the same dimension as the portion of image I that is not cut off by piece P. When the distance $d$ between the axes $T_1$ and $T_2$ is equal to the distance to be measured between surface elements $S_1$ and $S_2$ the partial image (portion of $I_1$) of the portion of image I not cut off by the left hand portion of P is just cut off by the right hand portion of piece P (on FIG. 1). It will thus be seen that the beginning or the end of the total disappearance of image $I_1$ corresponds to $d$ being equal to the distance to be measured, that is to say to the diameter of piece P. Consequently the time at which transducer 8 begins to be illuminated or ceases to be illuminated, and therefore the beginning, or the end, of the transmission of an electric signal by this transducer, permits of determining the time where $d$ is to be measured accurately.

In order to determine this distance $d$, measurement systems A and B are carried by two members 20 and 11, respectively, movable relatively to each other, one of these members carrying a graduated rule and the other a mark. In particular, pieces 20 and 11 are in the form of two sliding carriages each carrying a rack $20_b$ and $11_b$, respectively, both of these racks meshing with a freely movable pinion 12. Thus when member 20 slides in the direction of arrow $f$, sliding member 11 moves in the direction of arrow $f_0$.

The relative displacement of sliding members 20 and 11 is controlled for instance by means of a motor 14 (which may be, as hereinafter indicated, a selsyn or synchro-receiving motor) through an endless screw 13 meshing with a second rack $11_c$ carried by sliding member 11. Thus motor 14 moves sliding members 20 and 11 and consequently measurement systems A and B in opposed directions, so as to bring them to the distance $d$ from each other for which the energizing of transducer 8 begins or stops.

Determination of $d$ may be performed, in this case, by means of a graduated rule $20_a$ carried by sliding member 20 and of a mark carried by sliding member 11. In particular member 11 may carry a light source $11_a$ illuminating graduated rule $20_a$. The latter may consist of, for instance transparent lines at equal distances from one another traced on an opaque background. These transparent lines are illuminated by source $11_a$ and projected by an objective 9 (comprising lenses $9_a$ and $9_b$) onto a surface 49 on which is mounted a series of photoelectric transducers 10 (for instance ten transducers) which are swept successively by the light coming from every transparent line of scale $20_a$ when the latter moves with respect to the optical axis Z of system $11_a$, 9.

Transducers 10 have their outputs connected to a common conductor 50 so that the pulses transmitted by said transducer when they are illuminated pass through said conductor 50. These pulses are amplified by an amplifier 36 and counted by a counter 37. Counter 37 is advantageously, as shown, associated with a memory device 38, a reading device 39 and a program system 40 capable of controlling a machine-tool for machining a piece P. As a matter of fact, the measurement device according to the present invention, due to the fact that it operates without mechanical contact wih piece P, may advantageously be combined with a machine-tool to effect measurements during the machining and to permit of effecting corrections during successive machine operations without having to remove piece P from the machine-tool and without having to stop this machine-tool. A detailed description of the device for measuring distance $d$, that is to say of the portion of the device located above line Y—Y of FIG. 1 is given in the patent application No. 285,400, filed June 4, 1963 in the same name for "Improvements in Devices for Reading the Displacements of a Graduated Scale." In order to facilitate comparison with this application, FIG. 1 of the appended drawings uses the same reference numerals as FIG. 1 of said application to designate similar elements.

It will be easily understood that it is the distance $d$ between the parallel axes $T_1$ and $T_2$ of measurement systems A and B which determines the diameter of piece P between surface elements $S_1$ and $S_2$. Different modes of operation are possible to accomplish the measurement. In a first mode of operation both the image I forming elements 59 (source 1, slit 2 and lens 3) and the receiving elements 60 (lens 7 and transducer 8) are held stationary; measurement being carried out by moving measurement system A and/or system B (so that relative movement between A and B takes place) until the distance $d$ between $T_1$ and $T_2$ is equal to the distance to be measured between $S_1$ and $S_2$. In a second mode of operation the elements associated with axis $T_1$ (optical means 59 and system A) are movable together as a first unit and the elements associated with axis $T_2$ (receiving system 60 and system B) are movable together as a second unit; measurement being carried out by moving the first unit and/or the second unit (so that relative movement between the first and second units takes place) until the distance $d$ between $T_1$ and $T_2$ is equal to the distance to be measured between $S_1$ and $S_2$. With the first mode of operation it is possible to measure only a limited range of distances, the limits of the range depending upon the length of the slit 2. Of course, with the second mode of operation there is no limit on the distance that can be measured (except, of course, for practical limitations in a particular application). In this second mode, in order to obtain movement as a unit, means 59 may be mounted on a sliding member 15 and means 60 on a sliding member 16, said members 15 and 16 being analogous respectively to sliding members 20 and 11. A freely movable pinion 17 meshes with a rack $16_b$ carried by member 16 and with a rack $15_b$ carried by member 15. Thus sliding members 16 and 15 move in opposed direction. Finally, sliding member 16 carries a second rack $16_c$ cooperating with an endless screw 18 driven in rotation by a motor 19.

In order to obtain simultaneous operation of sliding members or carriages 11 and 20, on the one hand and 16 and 15 on the other hand, motors 14 and 19 may be made respectively in the form of a synchro-receiver and of a synchro-transmitter (selsyn motors). Motor, or synchro-transmitter, 19 is thus driven in rotation in such manner as to control, in cooperation with synchro-receiver 14, the relative displacement of members 20 and 11 on the one hand, and 16 and 15 on the other hand. Of course, it is possible to use only one single speed and to drive in this case synchro-transmitter 19 from a single motor. It is more advantageous to provide two speeds, to wit a fast speed for approaching the measurement position for systems A and B, and a slow speed just before reaching the measurement position for these systems. In this case, it is possible either to provide a single motor having a variable speed to drive synchro-transmitter 19 or a motor having a single speed and a change speed device for driving element 19. Finally it is possible, as shown by the drawings, to provide two motors, one having a slow speed, shown at 22, and the other having a high speed, shown at 21, an electro-magnetic clutch 23 being provided between the shafts of motor 22 and 21. In this case, motors 21 and 22 and clutch 23 may be controlled for instance in one of the three following manners:

(a) When the time of measurement is determined by the fact that photoelectric transducer 8 ceases to be illuminated, this transducer may feed its current into a selective amplifier 24, the output of which feeds current to a discriminator 25 which is capable of ensuring the starting and the stopping of motors 21 or 22 and clutch 23 through the intermediate of systems or units 27 and 28 in the following manner: discriminator 25 transmits different signals according as the voltage it receives from amplifier 24 is higher or lower than a given limit. This limit corresponds to the shifting from fast speed to slow speed, the voltage being higher than the limit when transducer 8 is strongly illuminated, that is to say when a substantial portion of image $I_1$ is not cut off or obturated, whereas the voltage is lower than the limit when image $I_1$ is nearly wholly cut off by piece P (in the measurement position image $I_1$ is completely obturated). Discriminator 25 therefore operates the fast motor 21 as long as the voltage it receives from amplifier 24 is above the above mentioned limit, and this through transmission unit 27 which controls the operation of only the fast motor 21, whereas, when the voltage it receives becomes lower than said limit, it controls, through transmission unit 28, the starting of the slow moving motor 22, the operation of clutch 23 and the stopping of motor 21. In this case, transmitter 19 is driven by motor 22.

(b) When the distance $d$ to be reached is known, being for instance recorded in memory device 38, same as the value from which shifting from the high speed to the slow speed should be produced, memory device 38, when it receives from counter 37 a numbered indication equal to said value, sends through line V control signals into units 27 and 28 which operate in the same manner as above stated in case (a). Unit 27 is then made nonoperative and the slow moving motor 22 and clutch 23 are now fed from unit 28 in such manner as to drive element 19 at the slow speed of motor 22.

(c) In a modification there may be provided an optical warning system comprising a swinging prism 31 (which may be located across the luminous path of axis $T_2$ downstream of the measured system B, for deflecting the light rays in order to transform the light beam of axis $T_2$ which normally strikes transducer 8 into a light beam of axis $T_0$) and a supplementary receiver comprising a lens $7_a$ and a photoelectric transducer $8_a$. Transducer $8_a$ ceases to be illuminated, or respectively starts being illuminated, shortly before the distance between A and B is equal to the value $d$ representing the measurement to be made. Transducer $8_a$ thus permits of determining when the measurement position is going to be reached. It is therefore possible to control, through a shifting unit R, units 27 and 28, that is to say the switching from fast speed to slow speed. At the same time, unit R produces the elimination of deflecting spring 31 from the optical beam and from this time on, it is transducer 8 that is illuminated.

Figures 6, 7, 8:
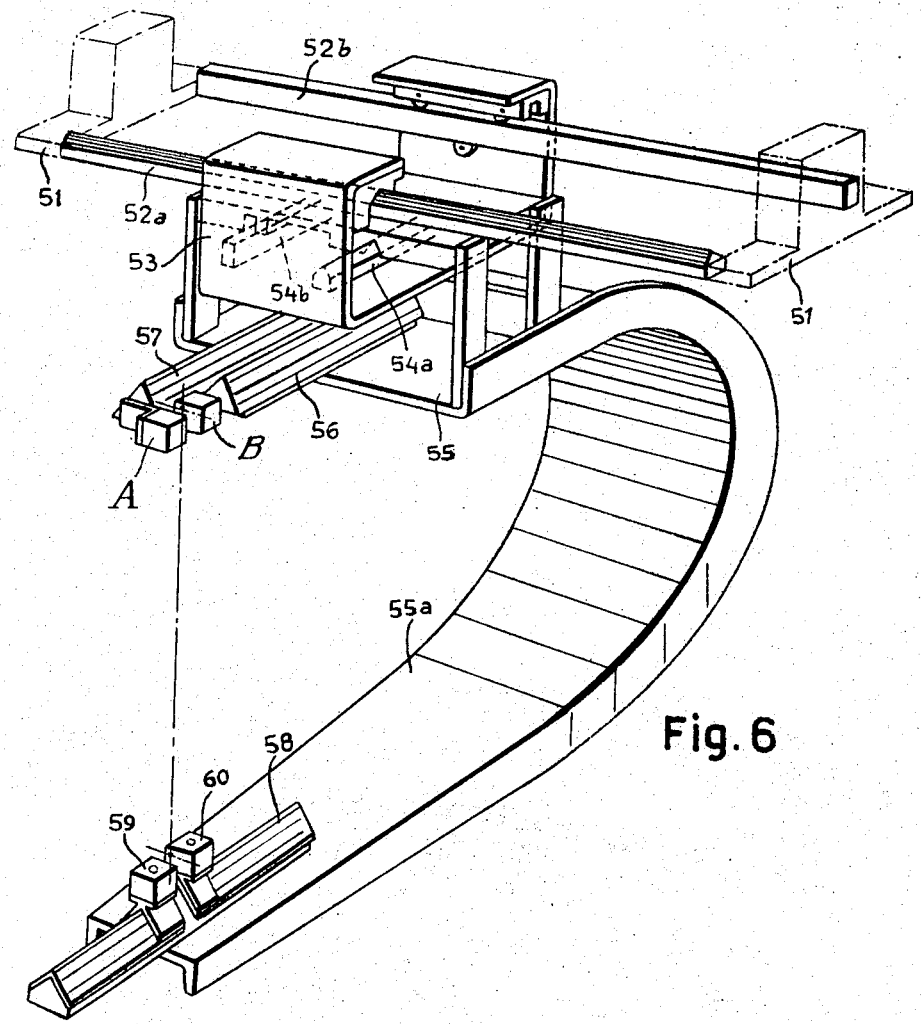
FIG. 6 shows an embodiment of means for supporting the elements of a device according to the present invention about a piece that is being machined.
FIGS. 7 and 8 are two curves illustrating the shifting from high speed to slow speed just before reaching the measurement position.

Shifting from the fast speed to the slow speed through discriminator 25 or unit R is illustrated by FIGS. 7 and 8 respectively.

In the case of an electronic warning (FIG. 7) use is made of the variation of the degree of energizing of transducer 8, as shown by said FIG. 7 where the times are plotted in abscissae and the voltages supplied by amplifier 24 in ordinates.

The shifting from fast speed to slow speed for instance corresponds to value $a$ intermediate between value $b$ (full illumination position) and the zero value (no illumination position), as visible at 0 on FIG. 7.

FIG. 8 shows the case of an optical warning, with deflecting prism 31 and auxiliary transducer $8_a$. The warning given by auxiliary transducer $8_a$ corresponds to the position marked $a_1$ on the diagram of FIG. 8, whereas measurement takes place in correspondence with position $b_1$, for which transducer 8 is fully illuminated. FIG. 8 shows the variations of the voltages supplied by transducers 8 and $8_a$ (plotted in ordinates) as a function of the time (plotted in abscissas).

In the case of electronic warning (FIG. 7) or optical warning (FIG. 8), the measurement may be effected either, as shown, for extinction or on the contrary for illumination. In this last case the warning is given at the beginning of illumination (weak illumination), effective measurement taking place when full illumination is reached (position corresponding to $b$ of $b_1$ respectively).

Figures 2, 3:
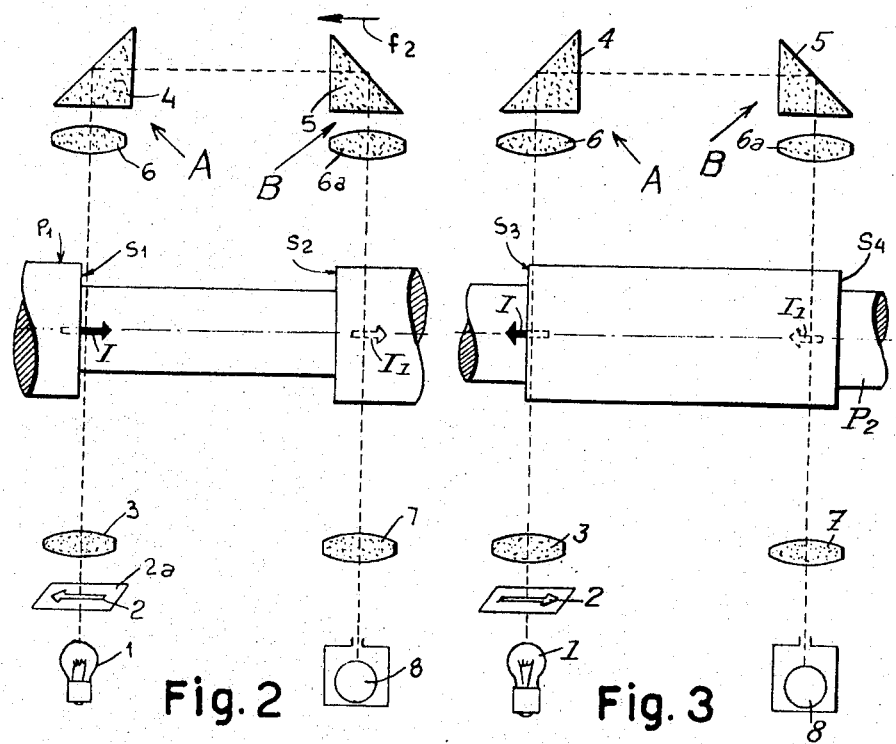
FIGS. 2 and 3 illustrate the application of the device of FIG. 1 to the measurement of axial distances, for instance between two shoulders.

Reference will be made now to FIGS. 2 and 3, which diagrammatically indicate how a device provided with the improvements according to the invention permits of determining axial distances, for instance between two shoulders constituting limit zones $S_1$ and $S_2$ on a piece $P_1$ or $P_2$ respectively. For such measurements, it is preferable to provide displacement means independent of systems A and B including elements 4 and 6 on the one hand and 5 and $6_a$ on the other hand.

For instance (FIG. 2) a piece $P_1$ with shoulders $S_1$ and $S_2$ may be placed in the optical circuit in such manner that the image of slit 2 is partly intercepted during a first phase of the measurement operation by shoulder $S_1$ so as to individualize the origin of the measurement by the position for which image I ceases to be intercepted by shoulder $S_1$ when moving system A in the direction of arrow $f_2$. Subsequently the second measurement is determined by displacing reflecting system B in the direction of arrow $f_2$ so as to determine the position for which transducer 8 begins to be energized by image $I_1$, which is no longer intercepted by shoulder $S_2$ (in this embodiment of the invention the image I is complete).

Of course, instead of displacements in the direction of arrow $f_2$, the displacements might be effected in the opposed direction for each of the systems A and B, so as to indicate either respectively the beginning or the end of the energizing of transducer 8.

As indicated by FIG. 3, it is possible to operate in the same manner to measure the distance between shoulders $S_3$ and $S_4$ on a piece $P_2$.

Although the measurements between shoulders such as $S_1$, $S_2$ or $S_3$, $S_4$ may be effected with slits 2 disposed in the plane of the reflections, as indicated by FIGS. 2 and 3, it is also possible to provide slits located in perpendicular planes to form images essentially parallel to the planes of shoulders $S_1$, $S_2$, $S_3$, $S_4$, the image of the slit being then relatively thin so as to avoid reading errors greater than the precision required for the measurement. Whereas, with slits in the plane of the reflections (case of FIGS. 2 and 3), the interception of portions of the image of the slit is effected by the shoulders, in the case of a slit disposed perpendicularly to the plane of the reflections, the shoulders themselves determine the formation or the disappearance of the image.

Figure 4:
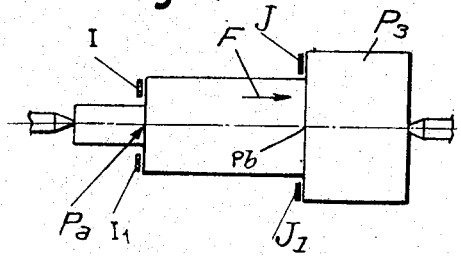
FIG. 4 illustrates the operation of a device according to the present invention for performing axial measurements between two shoulders of different diameters.

Such an arrangement of the images of the slits perpendicularly to the reflection plane is illustrated by FIG. 4, which concerns the application of the device according to the invention to perform a measurement between the shoulders by forming thin images and varying the distance between images I and $I_1$, on the one hand, and images J and $J_1$ on the other hand. These two pairs of images are positioned in the plane of shoulders $P_a$ and $P_b$. The reading devices (not shown in FIG. 4), disposed at a suitable distance from each other so as to obtain, as above indicated, the value of the distance at the level of the shoulders, are displaced first to form images I, $I_1$ at the limit of shoulder $P_a$, and then moved axially in the direction of arrow F so as to form images J and $J_1$ at the limit of shoulder $P_b$, the axial displacement between the two positions making it possible to determine the distance between the two shoulders.

In order to permit the measurement of such an axial displacement, the device must include a second system of the type shown by FIG. 1 above line Y—Y, this second system being disposed perpendicularly to that illustrated above said line Y—Y.

Figure 5:
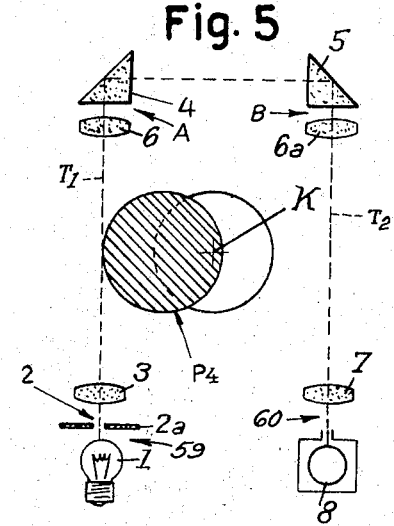
FIG. 5 shows the application of the device of FIG. 1 to measure an eccentricity.

It results from what precedes that the simultaneous movement of the two reading systems A and B is not essential for the operation. One may therefore provide, without departing from the scope of the invention, either independent means for displacing each of the systems A and B, or possibly means for displacing only one of these systems. As a matter of fact displacement of a single system, in particular of system A, is sufficient to measure eccentricities, as illustrated for instance by FIG. 5. Said figure shows at K the axis of a piece $P_4$ the eccentricity of which is to be measured. When the position of the axis of piece $P_4$ has been determined, it is possible to determine its eccentricity by the formation and the disappearance of the image of slit 2 at the level of piece $P_4$, slit 2 being advantageously parallel to the generatrices of piece $P_4$.

The device according to the present invention works, in the embodiment illustrated by FIG. 4, as described in the patent application No. 285,401 filed in the same name and on the same day as the present one for "Improvements in Linear Measurement Devices."

In some embodiments of the invention, when the length of slit 2 is sufficiently great, it is unnecessary to provide a displacement of the light source 1 to obtain measurements which differ between them by a value smaller than the length of said slit.

With the device according to the present invention, it is also possible to determine the profile of any given section of a piece to be examined by successively measuring the diametral dimensions of the piece. The piece may be kept stationary during every measurement, several successive measurements being effected with a modification, for each of them, of the position of piece P about its axis. For instance, a given diameter D (as illustrated by FIG. 1) may be made to occupy different positions. Alternately a source of modulated radiations, for instance a light source 1 which is switched on and off at a frequency $n$ (the source being switched on and off $n$ times per second), is provided and piece P is rotated at the same frequency (by causing it to make $n$ revolutions per second through means not shown by the drawings). If the phase relation between the angular position of piece P and the switching on and off of source 1 is varied, while maintaining synchronism between the frequency of rotation of piece P and said switching on and off of source 1, the distance $d$ is determined, by a stroboscopic effect, for different positions of diameter D (FIG. 1).

Concerning the displacement of movable members 20 and 11, which carry the measuring or reflecting systems A and B, it is possible to effect the relative displacement of these two pieces through means other than those illustrated by FIG. 1. It is possible, for instance, to provide a control through threaded rods or through hydraulic systems, with suitable fluid distributors or distributing means capable of controlling the reciprocal movement of the two pistons in the same cylinder.

Concerning the optical system, an example of which has been illustrated by the drawings, it may consist of combinations of reflecting prisms and cylindrical or spherical optical lenses, or even of curved mirrors capable of forming optical images of the type of those obtained with lenses 3, 6, $6_a$ and 7. It is also possible to provide for the interposition of lenses such as 6, $6_a$ across the light path between the two reflections on prisms 4 and 5 rather than along parallel beams having respective axes $T_1$ and $T_2$ which are tangent to the piece to be measured.

Finally, reference is made to FIG. 6 illustrating a mounting which permits a movement of systems A and B with respect to pieces mounted on suitable supports, not shown, and also a movement of system 59 for forming an image and of system 60 for collecting the image.

Said FIG. 6 shows fixed supports 51 carried by a frame, not shown, on which is supported the piece to be measured (also not shown). Between supports 51 are provided guiding means $52_a$, $52_b$ which permit sliding displacements, in a direction parallel to the axis of the piece, of a carriage 53 which in turn comprises guiding members $54_a$ and $54_b$ perpendicular to guiding means $52_a$, $52_b$. On guiding members $54_a$, $54_b$ is slidably mounted a carriage 55, which therefore moves in a direction perpendicular to the axis of the piece and carries guides for a pair of carriages 56 and 57 on which reflecting systems A and B are fixed, respectively.

An arm $55_a$ of carriage 55 serves to support a guiding element 58 or a pair of guiding elements, to permit the displacement of system 59 for the formation of the image and system 60 for collecting the image, parallelly to carriages 56 and 57. It is thus possible to displace in the desired manner and with respect to each other systems A and B on the one hand and systems 59 and 60 on the other hand.

The arrangement according to FIG. 6 permits a freedom of movement which is very convenient for setting the various pieces to be measured in position. It also permits great possibilities of displacement.

In a general manner, while the above description discloses what are deemed to be practical and efficient embodiments of the invention, said invention is not limited thereto as there might be changes made in the arrangement, disposition and form of the parts without departing from the principle of the invention as comprehended within the scope of the appended claims.

What I claim is:

1. A device for measuring at least one dimension between two opposite surface elements of a body which comprises, in combination, a source of radiation rays, a screen disposed between said source of radiation rays and said body, a slit formed in said screen for permitting the passage of some of the rays of said radiation source, the rays passing through the slit constituting a first beam, means for forming the first beam into a first image of said slit opposite a surface element of the body, reversing means disposed on the opposite side of said body from said screen for reversing the said first beam to form a second beam extending in a direction parallel and opposed to the direction of the said first beam, said reversing means comprising a collimating means for collimating the radiation rays of said first beam, a first reflecting means movable with said collimating means for receiving rays from said collimating means and reflecting the rays to a second reflecting means, the said second reflecting means arranged to reflect the radiation rays received from the first reflecting means to form said second beam, a second imaging means movable with said second reflecting means for receiving radiation from said second reflecting means and forming a second image of said slit opposite a second surface element of the body, the second image having the same orientation as the first image in a plane which includes both the first and second surface elements of the body, moving means for moving at least one of said reflecting means along a line transverse to the first and second beams, radiation sensitive means disposed on the opposite side of said body from said reflecting means and positioned to receive said second beam, means for measuring the distance between the first and second reflecting means, said distance representing the dimension to be measured at the instant when the movement of the reflecting means reaches a limit point between energization and de-energization of said radiation sensitive means, and means for supporting the said body so that relative movement may be provided between the body and at least one of said beams.

2. A device as claimed in claim 1 wherein said moving means comprises motor means adapted to produce high speed relative movement of said reflecting means, motor means adapted to produce low speed relative movements of said reflecting means, both of said motor means being capable of being brought into and out of operation so that one is inoperative when the other is in operation, and means responsive to the difference between the actual distance of said reflecting means from each other and the approximate distance between said two surface elements for bringing said first mentioned motor means into operation when the distance between said reflecting means is above a given limit and for bringing said second mentioned motor means into operation when said distance becomes lower than said limit.

3. A device according to claim 1, said radiation sensitive receiving means including at least one lens and a photoelectric transducer adapted to be illuminated through said lens by said second image and which ceases to be illuminated when said second image is cut off by the piece to be measured, the device further including means for stopping the relative displacement between the two lens and prism systems in response to said transducer being just at the limit between illumination and nonillumination thereof, the distance between the first and second beams then representing the value to be measured.

4. A device according to claim 3 which further comprises means for displacing with respect to each other said means for forming the first image of the slit and said receiving means in synchronism with the relative displacement of said optical reflecting means.

5. A device according to claim 1 wherein said source, said screen, and said means for forming the first beam are movable as a unit with one of said ray deflecting means, and said ray sensitive means is movable as a unit with the other of said ray deflecting means.

References Cited

UNITED STATES PATENTS

| 1,641,136 | 8/1937 | Dorn | 88—14 |
| 2,406,299 | 8/1946 | Koulicovitch | 250—237 |
| 2,670,651 | 3/1954 | Burns et al. | 88—14 |
| 2,810,316 | 10/1957 | Snyder | 250—219 |
| 2,845,756 | 8/1958 | Popke | 88—14 |
| 2,931,917 | 4/1960 | Beelitz | 250—219 |
| 3,125,682 | 3/1964 | Lindermann et al. | 88—14 |
| 3,174,392 | 3/1965 | Rantsch | 88—14 |

FOREIGN PATENTS 854,587  11/1962  Germany.

JEWELL H. PEDERSEN, *Primary Examiner.*

F. SHOON, A. A. KASHINSKI, *Assistant Examiners.*